United States Patent [19]

Jinnai et al.

[11] Patent Number: 4,542,385

[45] Date of Patent: Sep. 17, 1985

[54] INK JET PRINTING APPARATUS

[75] Inventors: Koichiro Jinnai; Yutaka Ebi, both of Tokyo, Japan

[73] Assignee: Ricoh Company, Ltd., Tokyo, Japan

[21] Appl. No.: 408,561

[22] Filed: Aug. 16, 1982

[30] Foreign Application Priority Data

Aug. 20, 1981 [JP] Japan ............................ 56-130782

[51] Int. Cl.[4] ........................................ G01D 15/18

[52] U.S. Cl. ................................................ 346/75

[58] Field of Search .................................... 346/75

[56] References Cited

U.S. PATENT DOCUMENTS 3,971,039 7/1976 Takano et al. ...................... 346/75

4,370,664 1/1983 Horike et al. ....................... 346/75

4,435,720 3/1984 Horike et al. ....................... 346/75

4,438,440 3/1984 Jinnai et al. ........................ 346/75

*Primary Examiner*—E. A. Goldberg

*Assistant Examiner*—Gerald E. Preston

*Attorney, Agent, or Firm*—David G. Alexander

[57] ABSTRACT

An ink jet printing apparatus includes an ink condition detector for detecting a condition of ink. The ink condition detector produces outputs which represent a plurality of parameters of the ink. The parameters are the ink temperature, the ink pressure and the velocity of ink droplets in flight. A control device controls a charging device and/or a deflection device to compensate for a distortion in print position in accordance with an ink condition detected by the ink condition detector.

5 Claims, 20 Drawing Figures

Fig. 2

| STEP | $F_3$ | $F_2$ | $F_1$ | Vcs | $P_1$ | $P_2$ | $P_3$ | $P_4$ | STEP | $F_3$ | $F_2$ | $F_1$ | Vcs | $P_1$ | $P_2$ | $P_3$ | $P_4$ |
|---|---|---|---|---|---|---|---|---|---|---|---|---|---|---|---|---|---|
| 1 | 000 | 000 | 001 | 209 | 01E | 008 | 000 | 000 | 17 | 002 | 004 | 00F | 435 | 00E | 00C | 009 | 007 |
| 2 | 000 | 000 | 002 | 22D | 00A | 008 | 001 | 001 | 18 | 002 | 005 | 00F | 457 | 00F | 00D | 009 | 007 |
| 3 | 000 | 001 | 003 | 251 | 00A | 003 | 001 | 001 | 19 | 002 | 005 | 00F | 478 | 010 | 00D | 009 | 008 |
| 4 | 000 | 001 | 003 | 274 | 00B | 004 | 001 | 001 | 20 | 002 | 005 | 010 | 499 | 010 | 00D | 009 | 009 |
| 5 | 000 | 001 | 004 | 297 | 00B | 004 | 002 | 002 | 21 | 002 | 006 | 010 | 4BA | 011 | 00F | 009 | 009 |
| 6 | 000 | 001 | 005 | 2BA | 00B | 006 | 002 | 002 | 22 | 002 | 006 | 010 | 4DB | 012 | 00F | 009 | 00A |
| 7 | 000 | 001 | 006 | 2DD | 00C | 006 | 003 | 002 | 23 | 002 | 007 | 011 | 4FC | 012 | 00F | 009 | 00A |
| 8 | 001 | 001 | 007 | 300 | 00D | 007 | 003 | 002 | 24 | 003 | 007 | 011 | 51D | 013 | 00F | 009 | 00B |
| 9 | 001 | 002 | 008 | 323 | 00E | 007 | 003 | 002 | 25 | 003 | 007 | 011 | 53D | 015 | 010 | 009 | 00C |
| 10 | 001 | 002 | 009 | 346 | 00E | 008 | 004 | 003 | 26 | 003 | 007 | 011 | 55D | 015 | 011 | 009 | 00C |
| 11 | 001 | 002 | 00A | 369 | 00E | 008 | 004 | 003 | 27 | 004 | 008 | 012 | 57D | 016 | 011 | 00A | 00D |
| 12 | 001 | 002 | 00B | 38B | 00D | 009 | 005 | 003 | 28 | 004 | 008 | 012 | 59C | 016 | 013 | 00B | 00D |
| 13 | 002 | 003 | 00C | 3AD | 00D | 00A | 005 | 004 | 29 | 004 | 008 | 012 | 5BB | 017 | 013 | 00D | 00E |
| 14 | 002 | 003 | 00D | 3CF | 00D | 00B | 006 | 005 | 30 | 000 | 008 | 012 | 5DA | 016 | 013 | 00E | 00E |
| 15 | 002 | 003 | 00E | 3F1 | 00E | 00B | 007 | 005 | 31 | 000 | 7FF | 012 | 5F9 | 019 | 014 | 00F | 00F |
| 16 | 002 | 004 | 00F | 413 | 00E | 00C | 008 | 006 | 32 | 000 | 000 | 001 | 61B | 01A | 014 | 011 | 010 |

Fig. 8a

| LOW | | | | | | | | | |
|---|---|---|---|---|---|---|---|---|---|
| STEP | ADD | K2 | K1 | VCS | S1 | S2 | S3 | S4 | S5 |
| 1 | 0100 | 0 | 2 | 25C | 10 | 1 | 0 | 0 | 0 |
| 2 | 08 | 0 | 2 | 27D | 8 | 1 | 0 | 0 | 0 |
| 3 | 10 | 1 | 3 | 29F | A | 3 | 1 | 0 | 0 |
| 4 | 18 | 1 | 3 | 2BE | C | 6 | 5 | 0 | 0 |
| 5 | 20 | 1 | 3 | 2DE | C | 6 | 5 | 2 | 0 |
| 6 | 28 | 1 | 4 | 2FD | B | 6 | 4 | 3 | FFB (-5) |
| 7 | 30 | 1 | 4 | 31F | B | 6 | 4 | 3 | (-1) FFF |
| 8 | 38 | 1 | 4 | 33D | D | 6 | 4 | 3 | 3 |
| 9 | 40 | 1 | 5 | 35F | D | 6 | 4 | 4 | 3 |
| 10 | 48 | 1 | 5 | 37D | B | 6 | 5 | 4 | 4 |
| 11 | 50 | 1 | 6 | 39C | B | 6 | 5 | 5 | 4 |
| 12 | 58 | 1 | 7 | 3BF | C | 7 | 5 | 5 | 4 |
| 13 | 60 | 1 | 9 | 3DE | C | 7 | 6 | 5 | 5 |
| 14 | 68 | 1 | A | 3FE | D | 8 | 7 | 6 | 5 |
| 15 | 70 | 1 | B | 41C | D | 8 | 7 | 7 | 6 |
| 16 | 78 | 1 | B | 43C | E | 8 | 8 | 7 | 6 |
| 17 | 80 | 2 | B | 45B | E | 9 | 9 | 8 | 7 |
| 18 | 88 | 2 | B | 47B | E | A | 9 | 9 | 8 |
| 19 | 90 | 2 | B | 495 | F | B | A | 9 | 9 |
| 20 | 98 | 3 | C | 4B5 | 10 | C | B | A | B |
| 21 | A0 | 3 | E | 4D3 | 10 | C | C | B | B |
| 22 | AB | 3 | F | 4F1 | 11 | D | D | C | C |
| 23 | B0 | 3 | 10 | 50F | 11 | E | E | D | C |
| 24 | B8 | 3 | 10 | 52E | 12 | F | F | D | D |
| 25 | C0 | 4 | 10 | 54E | 13 | F | F | D | D |
| 26 | C8 | 4 | F | 569 | 13 | F | F | D | C |
| 27 | D0 | 4 | F | 587 | 14 | F | E | D | C |
| 28 | D8 | 4 | F | 5A2 | 15 | 10 | E | D | C |
| 29 | E0 | 5 | F | 5C0 | 15 | 10 | F | D | C |
| 30 | E8 | 5 | F | 5DB | 15 | 10 | F | E | D |
| 31 | F0 | 1 | 10 | 5FB | 15 | 10 | 10 | F | D |
| 32 | F8 | 1 | 1 | 61B | 17 | 11 | 10 | F | E |

Fig. 8b

| HIGH | | | | | | | | | |
|---|---|---|---|---|---|---|---|---|---|
| STEP | ADD | K2 | K1 | VCS | S1 | S2 | S3 | S4 | S5 |
| 1 | 0000 | 1 | 3 | 252 | 11 | 2 | 1 | 1 | 1 |
| 2 | 08 | 1 | 3 | 273 | 7 | 1 | 0 | 0 | 0 |
| 3 | 10 | 1 | 3 | 297 | 7 | 3 | 1 | 0 | 0 |
| 4 | 18 | 0 | 3 | 2B5 | 8 | 2 | 3 | 0 | 0 |
| 5 | 20 | 0 | 3 | 2D4 | 8 | 2 | 2 | 2 | 0 |
| 6 | 28 | 0 | 4 | 2F5 | 9 | 3 | 3 | 2 | 2 |
| 7 | 30 | 0 | 5 | 314 | A | 4 | 4 | 4 | 3 |
| 8 | 38 | 1 | 5 | 333 | C | 5 | 5 | 5 | 4 |
| 9 | 40 | 1 | 5 | 357 | C | 5 | 5 | 5 | 4 |
| 10 | 48 | 1 | 4 | 376 | C | 5 | 5 | 4 | 4 |
| 11 | 50 | 1 | 4 | 395 | B | 5 | 4 | 4 | 4 |
| 12 | 58 | 2 | 5 | 3B4 | C | 5 | 4 | 4 | 4 |
| 13 | 60 | 2 | 6 | 3D6 | C | 6 | 5 | 4 | 4 |
| 14 | 68 | 3 | 6 | 3F5 | D | 6 | 5 | 4 | 4 |
| 15 | 70 | 2 | 7 | 415 | D | 7 | 5 | 5 | 4 |
| 16 | 78 | 1 | 9 | 433 | E | 7 | 5 | 5 | 5 |
| 17 | 80 | 2 | B | 452 | F | 7 | 6 | 6 | 5 |
| 18 | 88 | 2 | B | 473 | F | 8 | 7 | 7 | 6 |
| 19 | 90 | 3 | B | 491 | 10 | 9 | 8 | 7 | 7 |
| 20 | 98 | 3 | B | 4AE | 11 | A | 9 | 8 | 8 |
| 21 | A0 | 3 | C | 4CE | 10 | 9 | 8 | 8 | 7 |
| 22 | A8 | 3 | E | 4EC | 10 | 8 | 7 | 7 | 6 |
| 23 | B0 | 4 | 10 | 50E | 10 | 8 | 7 | 6 | 5 |
| 24 | B8 | 4 | F | 52C | 10 | 7 | 7 | 5 | 5 |
| 25 | C0 | 5 | E | 549 | 10 | 8 | 8 | 7 | 7 |
| 26 | C8 | 5 | D | 565 | 11 | A | 9 | A | 9 |
| 27 | D0 | 6 | D | 586 | 12 | B | A | A | 9 |
| 28 | D8 | 7 | E | 5A0 | 13 | C | B | A | 9 |
| 29 | F0 | 7 | F | 5BD | 12 | C | B | A | 9 |
| 30 | F8 | 8 | 10 | 5DB | 11 | B | B | A | 9 |
| 31 | F0 | 1 | 11 | 5FD | 11 | B | B | B | 8 |
| 32 | F8 | 0 | 3 | 618 | 11 | B | B | B | 8 |

*Fig. 10a*

| LOW | | | | | | | | | |
|---|---|---|---|---|---|---|---|---|---|
| STEP | ADD | K2 | K1 | VCS | S1 | S2 | S3 | S4 | S5 |
| 1 | 0100 | 0 | 2 | 25C | 10 | 1 | 0 | 0 | 0 |
| 2 | 08 | 0 | 2 | 27D | 8 | 1 | 0 | 0 | 0 |
| 3 | 10 | 1 | 3 | 29F | A | 3 | 1 | 0 | 0 |
| 4 | 18 | 1 | 3 | 2BE | C | 6 | 5 | 0 | 0 |
| 5 | 20 | 1 | 3 | 2DE | C | 6 | 5 | 2 | 0 |
| 6 | 28 | 1 | 4 | 2FD | B | 6 | 4 | 3 | FEB (-5) |
| 7 | 30 | 1 | 4 | 31F | B | 6 | 4 | 3 | (-1) FFF |
| 8 | 38 | 1 | 4 | 33D | D | 6 | 4 | 3 | 3 |
| 9 | 40 | 1 | 5 | 35F | D | 6 | 4 | 4 | 3 |
| 10 | 48 | 1 | 5 | 37D | B | 6 | 5 | 4 | 4 |
| 11 | 50 | 1 | 6 | 39C | B | 6 | 5 | 5 | 4 |
| 12 | 58 | 1 | 7 | 38F | C | 7 | 5 | 5 | 4 |
| 13 | 60 | 1 | 9 | 3DE | C | 7 | 6 | 5 | 5 |
| 14 | 68 | 1 | A | 3FE | D | 8 | 7 | 6 | 5 |
| 15 | 70 | 1 | B | 41C | D | 8 | 7 | 7 | 6 |
| 16 | 78 | 1 | B | 43C | E | 8 | 8 | 7 | 6 |
| 17 | 80 | 2 | B | 45B | E | 9 | 9 | 8 | 7 |
| 18 | 88 | 2 | B | 478 | E | A | 9 | 9 | 8 |
| 19 | 90 | 2 | B | 495 | F | B | A | 9 | 9 |
| 20 | 98 | 3 | C | 4B5 | 10 | C | B | A | B |
| 21 | A0 | 3 | E | 4D3 | 10 | C | C | B | B |
| 22 | A8 | 3 | F | 4F1 | 11 | D | D | C | C |
| 23 | B0 | 3 | 10 | 50F | 11 | E | E | D | C |
| 24 | B8 | 3 | 10 | 52E | 12 | F | F | D | D |
| 25 | C0 | 4 | 10 | 54E | 13 | F | F | D | D |
| 26 | C8 | 4 | F | 569 | 13 | F | F | D | C |
| 27 | D0 | 4 | F | 587 | 14 | F | E | D | C |
| 28 | D8 | 4 | F | 5A2 | 15 | 10 | E | D | C |
| 29 | E0 | 5 | F | 5C0 | 15 | 10 | F | D | C |
| 30 | E8 | 5 | F | 5DB | 15 | 10 | F | E | D |
| 31 | F0 | 1 | 10 | 5FB | 15 | 10 | 10 | F | D |
| 32 | F8 | 1 | 1 | 618 | 17 | 11 | 10 | F | E |

Fig. 10b

| HIGH | | | | | | | | | |
|---|---|---|---|---|---|---|---|---|---|
| STEP | ADD | K2 | K1 | VCS | S1 | S2 | S3 | S4 | S5 |
| 1 | 0000 | 1 | 3 | 252 | 11 | 2 | 1 | 1 | 1 |
| 2 | 08 | 1 | 3 | 273 | 7 | 1 | 0 | 0 | 0 |
| 3 | 10 | 1 | 3 | 297 | 7 | 3 | 1 | 0 | 0 |
| 4 | 18 | 0 | 3 | 285 | 8 | 2 | 3 | 0 | 0 |
| 5 | 20 | 0 | 3 | 2D4 | 8 | 2 | 2 | 2 | 0 |
| 6 | 28 | 0 | 4 | 2F5 | 9 | 3 | 3 | 2 | 2 |
| 7 | 30 | 0 | 5 | 314 | A | 4 | 4 | 4 | 3 |
| 8 | 38 | 1 | 5 | 333 | C | 5 | 5 | 5 | 4 |
| 9 | 40 | 1 | 5 | 357 | C | 5 | 5 | 5 | 4 |
| 10 | 48 | 1 | 4 | 376 | C | 5 | 5 | 4 | 4 |
| 11 | 50 | 1 | 4 | 395 | B | 5 | 4 | 4 | 4 |
| 12 | 58 | 2 | 5 | 3B4 | C | 5 | 4 | 4 | 4 |
| 13 | 60 | 2 | 6 | 3D6 | C | 6 | 5 | 4 | 4 |
| 14 | 68 | 3 | 6 | 3F5 | D | 6 | 5 | 4 | 4 |
| 15 | 70 | 2 | 7 | 415 | D | 7 | 5 | 5 | 4 |
| 16 | 78 | 1 | 9 | 433 | E | 7 | 5 | 5 | 5 |
| 17 | 80 | 2 | B | 452 | F | 7 | 6 | 6 | 5 |
| 18 | 88 | 2 | B | 473 | F | 8 | 7 | 7 | 6 |
| 19 | 90 | 3 | B | 491 | 10 | 9 | 8 | 7 | 7 |
| 20 | 98 | 3 | B | 4AE | 11 | A | 9 | 8 | 8 |
| 21 | A0 | 3 | C | 4CE | 10 | 9 | 8 | 8 | 7 |
| 22 | A8 | 3 | E | 4EC | 10 | 8 | 7 | 7 | 6 |
| 23 | B0 | 4 | 10 | 50E | 10 | 8 | 7 | 6 | 5 |
| 24 | B8 | 4 | F | 52C | 10 | 7 | 7 | 5 | 5 |
| 25 | C0 | 5 | E | 549 | 10 | 8 | 8 | 7 | 7 |
| 26 | C8 | 5 | D | 565 | 11 | A | 9 | A | 9 |
| 27 | D0 | 6 | D | 586 | 12 | B | A | A | 9 |
| 28 | D8 | 7 | E | 5A0 | 13 | C | B | A | 9 |
| 29 | F0 | 7 | F | 5BD | 12 | C | B | A | 9 |
| 30 | F8 | 8 | 10 | 5DB | 11 | B | B | A | 9 |
| 31 | F0 | 1 | 11 | 5FD | 11 | B | B | B | 8 |
| 32 | F8 | 0 | 3 | 61B | 11 | B | B | B | 8 |

Fig. 13a

| LOW | | | | | | | | | |
|---|---|---|---|---|---|---|---|---|---|
| STEP | ADD | K2 | K1 | VCS | S1 | S2 | S3 | S4 | S5 |
| 1 | 0100 | 0 | 2 | 25C | 10 | 1 | 0 | 0 | 0 |
| 2 | 08 | 0 | 2 | 27D | 8 | 1 | 0 | 0 | 0 |
| 3 | 10 | 1 | 3 | 29F | A | 3 | 1 | 0 | 0 |
| 4 | 18 | 1 | 3 | 2BE | C | 6 | 5 | 0 | 0 |
| 5 | 20 | 1 | 3 | 2DE | C | 6 | 5 | 2 | 0 |
| 6 | 28 | 1 | 4 | 2FD | B | 6 | 4 | 3 | FFB (-5) |
| 7 | 30 | 1 | 4 | 31F | B | 6 | 4 | 3 | (-1) FFF |
| 8 | 38 | 1 | 4 | 33D | D | 6 | 4 | 3 | 3 |
| 9 | 40 | 1 | 5 | 35F | D | 6 | 4 | 4 | 3 |
| 10 | 48 | 1 | 5 | 37D | B | 6 | 5 | 4 | 4 |
| 11 | 50 | 1 | 6 | 39C | B | 6 | 5 | 5 | 4 |
| 12 | 58 | 1 | 7 | 38F | C | 7 | 5 | 5 | 4 |
| 13 | 60 | 1 | 9 | 3DE | C | 7 | 6 | 5 | 5 |
| 14 | 68 | 1 | A | 3FE | D | 8 | 7 | 6 | 5 |
| 15 | 70 | 1 | B | 41C | D | 8 | 7 | 7 | 6 |
| 16 | 78 | 1 | B | 43C | E | 8 | 8 | 7 | 6 |
| 17 | 80 | 2 | B | 45B | E | 9 | 9 | 8 | 7 |
| 18 | 88 | 2 | B | 47B | E | A | 9 | 9 | 8 |
| 19 | 90 | 2 | B | 495 | F | B | A | 9 | 9 |
| 20 | 98 | 3 | C | 4B5 | 10 | C | B | A | B |
| 21 | A0 | 3 | E | 4D3 | 10 | C | C | B | B |
| 22 | A8 | 3 | F | 4F1 | 11 | D | D | C | C |
| 23 | B0 | 3 | 10 | 50F | 11 | E | E | D | C |
| 24 | B8 | 3 | 10 | 52E | 12 | F | F | D | D |
| 25 | C0 | 4 | 10 | 54E | 13 | F | F | D | D |
| 26 | C8 | 4 | F | 569 | 13 | F | F | D | C |
| 27 | D0 | 4 | F | 587 | 14 | F | E | D | C |
| 28 | D8 | 4 | F | 5A2 | 15 | 10 | E | D | C |
| 29 | E0 | 5 | F | 5C0 | 15 | 10 | F | D | C |
| 30 | E8 | 5 | F | 5D8 | 15 | 10 | F | E | D |
| 31 | F0 | 1 | 10 | 5F8 | 15 | 10 | 10 | F | D |
| 32 | F8 | 1 | 1 | 618 | 17 | 11 | 10 | F | E |

Fig. 13b

| HIGH | | | | | | | | | |
|---|---|---|---|---|---|---|---|---|---|
| STEP | ADD | K2 | K1 | VCS | S1 | S2 | S3 | S4 | S5 |
| 1 | 0000 | 1 | 3 | 252 | 11 | 2 | 1 | 1 | 1 |
| 2 | 08 | 1 | 3 | 273 | 7 | 1 | 0 | 0 | 0 |
| 3 | 10 | 1 | 3 | 297 | 7 | 3 | 1 | 0 | 0 |
| 4 | 18 | 0 | 3 | 2B5 | 8 | 2 | 3 | 0 | 0 |
| 5 | 20 | 0 | 3 | 2D4 | 8 | 2 | 2 | 2 | 0 |
| 6 | 28 | 0 | 4 | 2F5 | 9 | 3 | 3 | 2 | 2 |
| 7 | 30 | 0 | 5 | 314 | A | 4 | 4 | 4 | 3 |
| 8 | 38 | 1 | 5 | 333 | C | 5 | 5 | 5 | 4 |
| 9 | 40 | 1 | 5 | 357 | C | 5 | 5 | 5 | 4 |
| 10 | 48 | 1 | 4 | 376 | C | 5 | 5 | 4 | 4 |
| 11 | 50 | 1 | 4 | 395 | B | 5 | 4 | 4 | 4 |
| 12 | 58 | 2 | 5 | 384 | C | 5 | 4 | 4 | 4 |
| 13 | 60 | 2 | 6 | 3D6 | C | 6 | 5 | 4 | 4 |
| 14 | 68 | 3 | 6 | 3F5 | D | 6 | 5 | 4 | 4 |
| 15 | 70 | 2 | 7 | 415 | D | 7 | 5 | 5 | 4 |
| 16 | 78 | 1 | 9 | 433 | E | 7 | 5 | 5 | 5 |
| 17 | 80 | 2 | B | 452 | F | 7 | 6 | 6 | 5 |
| 18 | 88 | 2 | B | 473 | F | 8 | 7 | 7 | 6 |
| 19 | 90 | 3 | B | 491 | 10 | 9 | 8 | 7 | 7 |
| 20 | 98 | 3 | B | 4AE | 11 | A | 9 | 8 | 8 |
| 21 | A0 | 3 | C | 4CE | 10 | 9 | 8 | 8 | 7 |
| 22 | A8 | 3 | E | 4EC | 10 | 8 | 7 | 7 | 6 |
| 23 | B0 | 4 | 10 | 50E | 10 | 8 | 7 | 6 | 5 |
| 24 | B8 | 4 | F | 52C | 10 | 7 | 7 | 5 | 5 |
| 25 | C0 | 5 | E | 549 | 10 | 8 | 8 | 7 | 7 |
| 26 | C8 | 5 | D | 565 | 11 | A | 9 | A | 9 |
| 27 | D0 | 6 | D | 586 | 12 | B | A | A | 9 |
| 28 | D8 | 7 | E | 5A0 | 13 | C | B | A | 9 |
| 29 | F0 | 7 | F | 5BD | 12 | C | B | A | 9 |
| 30 | F8 | 8 | 10 | 5DB | 11 | B | B | A | 9 |
| 31 | F0 | 1 | 11 | 5FD | 11 | B | B | B | 8 |
| 32 | F8 | 0 | 3 | 618 | 11 | B | B | B | 8 |

*Fig. 16a*

| LOW | | | | | | | | | |
|---|---|---|---|---|---|---|---|---|---|
| STEP | ADD | K2 | K1 | VCS | S1 | S2 | S3 | S4 | S5 |
| 1 | 0100 | 0 | 2 | 25C | 10 | 1 | 0 | 0 | 0 |
| 2 | 08 | 0 | 2 | 27D | 8 | 1 | 0 | 0 | 0 |
| 3 | 10 | 1 | 3 | 29F | A | 3 | 1 | 0 | 0 |
| 4 | 18 | 1 | 3 | 2BE | C | 6 | 5 | 0 | 0 |
| 5 | 20 | 1 | 3 | 2DE | C | 6 | 5 | 2 | 0 |
| 6 | 28 | 1 | 4 | 2FD | B | 6 | 4 | 3 | FFB (-5) |
| 7 | 30 | 1 | 4 | 31F | B | 6 | 4 | 3 | (-1) FFF |
| 8 | 38 | 1 | 4 | 33D | D | 6 | 4 | 3 | 3 |
| 9 | 40 | 1 | 5 | 35F | D | 6 | 4 | 4 | 3 |
| 10 | 48 | 1 | 5 | 37D | B | 6 | 5 | 4 | 4 |
| 11 | 50 | 1 | 6 | 39C | B | 6 | 5 | 5 | 4 |
| 12 | 58 | 1 | 7 | 3BF | C | 7 | 5 | 5 | 4 |
| 13 | 60 | 1 | 9 | 3DE | C | 7 | 6 | 5 | 5 |
| 14 | 68 | 1 | A | 3FE | D | 8 | 7 | 6 | 5 |
| 15 | 70 | 1 | B | 41C | D | 8 | 7 | 7 | 6 |
| 16 | 78 | 1 | B | 43C | E | 8 | 8 | 7 | 6 |
| 17 | 80 | 2 | B | 45B | E | 9 | 9 | 8 | 7 |
| 18 | 88 | 2 | B | 478 | E | A | 9 | 9 | 8 |
| 19 | 90 | 2 | B | 495 | F | B | A | 9 | 9 |
| 20 | 98 | 3 | C | 485 | 10 | C | B | A | B |
| 21 | A0 | 3 | E | 4D3 | 10 | C | C | B | B |
| 22 | A8 | 3 | F | 4F1 | 11 | D | D | C | C |
| 23 | B0 | 3 | 10 | 50F | 11 | F | E | D | C |
| 24 | B8 | 3 | 10 | 52E | 12 | F | F | D | D |
| 25 | C0 | 4 | 10 | 54E | 13 | F | F | D | D |
| 26 | C8 | 4 | F | 569 | 13 | F | F | D | C |
| 27 | D0 | 4 | F | 587 | 14 | F | E | D | C |
| 28 | D8 | 4 | F | 5A2 | 15 | 10 | E | D | C |
| 29 | E0 | 5 | F | 5C0 | 15 | 10 | F | D | C |
| 30 | E8 | 5 | F | 5DB | 15 | 10 | F | E | D |
| 31 | F0 | 1 | 10 | 5FB | 15 | 10 | 10 | F | D |
| 32 | FB | 1 | 1 | 61B | 17 | 11 | 10 | F | E |

*Fig. 16b*

| HIGH | | | | | | | | | |
|---|---|---|---|---|---|---|---|---|---|
| STEP | ADD | K2 | K1 | VCS | S1 | S2 | S3 | S4 | S5 |
| 1 | 0000 | 1 | 3 | 252 | 11 | 2 | 1 | 1 | 1 |
| 2 | 08 | 1 | 3 | 273 | 7 | 1 | 0 | 0 | 0 |
| 3 | 10 | 1 | 3 | 297 | 7 | 3 | 1 | 0 | 0 |
| 4 | 18 | 0 | 3 | 2B5 | 8 | 2 | 3 | 0 | 0 |
| 5 | 20 | 0 | 3 | 2D4 | 8 | 2 | 2 | 2 | 0 |
| 6 | 28 | 0 | 4 | 2F5 | 9 | 3 | 3 | 2 | 2 |
| 7 | 30 | 0 | 5 | 314 | A | 4 | 4 | 4 | 3 |
| 8 | 38 | 1 | 5 | 333 | C | 5 | 5 | 5 | 4 |
| 9 | 40 | 1 | 5 | 357 | C | 5 | 5 | 5 | 4 |
| 10 | 48 | 1 | 4 | 376 | C | 5 | 5 | 4 | 4 |
| 11 | 50 | 1 | 4 | 395 | B | 5 | 4 | 4 | 4 |
| 12 | 58 | 2 | 5 | 3B4 | C | 5 | 4 | 4 | 4 |
| 13 | 60 | 2 | 6 | 3D6 | C | 6 | 5 | 4 | 4 |
| 14 | 68 | 3 | 6 | 3F5 | D | 6 | 5 | 4 | 4 |
| 15 | 70 | 2 | 7 | 415 | D | 7 | 5 | 5 | 4 |
| 16 | 78 | 1 | 9 | 433 | E | 7 | 5 | 5 | 5 |
| 17 | 80 | 2 | B | 452 | F | 7 | 6 | 6 | 5 |
| 18 | 88 | 2 | B | 473 | F | 8 | 7 | 7 | 6 |
| 19 | 90 | 3 | B | 491 | 10 | 9 | 8 | 7 | 7 |
| 20 | 98 | 3 | B | 4AE | 11 | A | 9 | 8 | 8 |
| 21 | A0 | 3 | C | 4CE | 10 | 9 | 8 | 8 | 7 |
| 22 | A8 | 3 | E | 4EC | 10 | 8 | 7 | 7 | 6 |
| 23 | B0 | 4 | 10 | 50E | 10 | 8 | 7 | 6 | 5 |
| 24 | B8 | 4 | F | 52C | 10 | 7 | 7 | 5 | 5 |
| 25 | C0 | 5 | E | 549 | 10 | 8 | 8 | 7 | 7 |
| 26 | C8 | 5 | D | 565 | 11 | A | 9 | A | 9 |
| 27 | D0 | 6 | D | 586 | 12 | B | A | A | 9 |
| 28 | D8 | 7 | E | 5A0 | 13 | C | B | A | 9 |
| 29 | F0 | 7 | F | 5BD | 12 | C | B | A | 9 |
| 30 | F8 | 8 | 10 | 5DB | 11 | B | B | A | 9 |
| 31 | F0 | 1 | 11 | 5FD | 11 | B | B | B | 8 |
| 32 | F8 | 0 | 3 | 618 | 11 | B | B | B | 8 |

INK JET PRINTING APPARATUS

BACKGROUND OF THE INVENTION

The present invention relates to an improvement in an ink jet printing apparatus in which at least one nozzle ejects a jet of ink subjected to supersonic vibration and a charging electrode selectively charges the ink at a position where the jet separates into droplets whereupon deflecting electrodes deflect the charged droplets of ink causing them to impinge on a sheet of paper. More particularly, the present invention relates to a new ink jet printing apparatus of the type described which enhances the quality of reproduction by minimizing the fluctuation of deflection or distortion which may result from a change of ambient conditions or that of operating conditions.

Generally, an ink jet printer of this type is so constructed as to charge ink droplets in accordance with print data and deflect them so that the ink droplets impinge on a sheet of paper to print out desired data thereon. Each of the flying ink droplets generates a stream of air behind it. When an ink droplet enters a stream of air generated by the immediately preceding ink droplet, the aerodynamic resistance acting on the following ink droplet is reduced to such a degree that the distance between the adjacent ink droplets may become smaller or even zero. The result is the distortion to an image or character printed out on the sheet. The distortion also results from the Coulomb's force which would act between the adjacent charged ink droplets to affect their distance. Additionally, each charged ink droplet ahead of one which is about to be charged might reduce the expected amount of charge on the latter thereby further promoting the distortion.

One of solutions to such a problem is disclosed in U.S. Pat. No. 3,946,399. The technique taught by this U.S. Patent is to make up for the mutual influence of adjacent charged ink droplets due to the Coulomb's force and the deflection due to the aerodynamic resistance by detecting a print pattern in advance and compensating a charging amount in accordance with the detected pattern.

The technique mentioned above, however, will become ineffective when the number of deflection steps is substantial such as 32 steps, for example. With the increase in the number of deflection steps, the distance between the adjacent ink droplets is made shorter to promote the distortion. Additionally, the flight time of an ink droplet and, therefore, the amount of distortion are dependent on the amount of deflection. It follows that the distortion cannot be adequately compensated for unless compensated in conformity to a specific number of deflection steps.

Meanwhile, it has been customary to supply an ink ejection head with an ink under predetermined pressure by means of a constant pressure pump or the like. However, difficulty has been experienced in so supplying the ink due to the scattering in nozzle diameters of ink jet heads and because the filter tends to be stopped up to invite a pressure loss. Even if a supply of ink under constant pressure could be realized, any change of temperature adjacent the nozzle would change the viscosity of ink around the nozzle. This would vary the velocity or kinetic energy of a flying ink droplet and, thereby, the deflection and distortion.

Thus, a temperature control has heretofore been carried out to control the ink temperature around the nozzle to a predetermined level. Such a control has still involved a problem concerning the buildup time of the printer, because the printer usually requires about one minute to have the temperature around the nozzle elevated, for example, from 5° C. up to a desired level (25° C).

SUMMARY OF THE INVENTION

It is an object of the present invention to provide an ink jet recording apparatus of the type described which quickly builds up to operable conditions, minimizes the changes of deflection and distortion due to the change of pressure or the like or the scattering in nozzle diameters, and thereby ensures high quality data reproduction.

It is another object of the present invention to provide an ink jet recording apparatus of the type described which achieves an improved quality of data reproduction by compensating an amount of compensation for the distortion of a deflected ink droplet in conformity to its amount of deflection, i.e. kinetic energy or flying velocity.

It is another object of the present invention to provide a generally improved ink jet printing apparatus of the type described.

Other objects, together with the foregoing, are attained in the embodiments described in the following description and illustrated in the accompanying drawings.

BRIEF DESCRIPTION OF THE DRAWINGS

FIG. 2 is a table showing an example of data stored in a storage (compensation table) of the apparatus indicated in FIG. 1;

FIGS. 8*a* and 8*b* are tables showing examples of different storages (compensation tables) used for the apparatus of FIG. 6;

FIGS. 10*a* and 10*b* are tables showing examples of different storages (compensation tables) used for the apparatus whose operation is indicated in FIG. 9;

FIGS. 13*a* and 13*b* are tables showing examples of different storages (compensation tables) used for the apparatus of FIG. 11;

FIGS. 16*a* and 16*b* are tables showing examples of different storages (compensation tables) used for the apparatus of FIG. 14.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
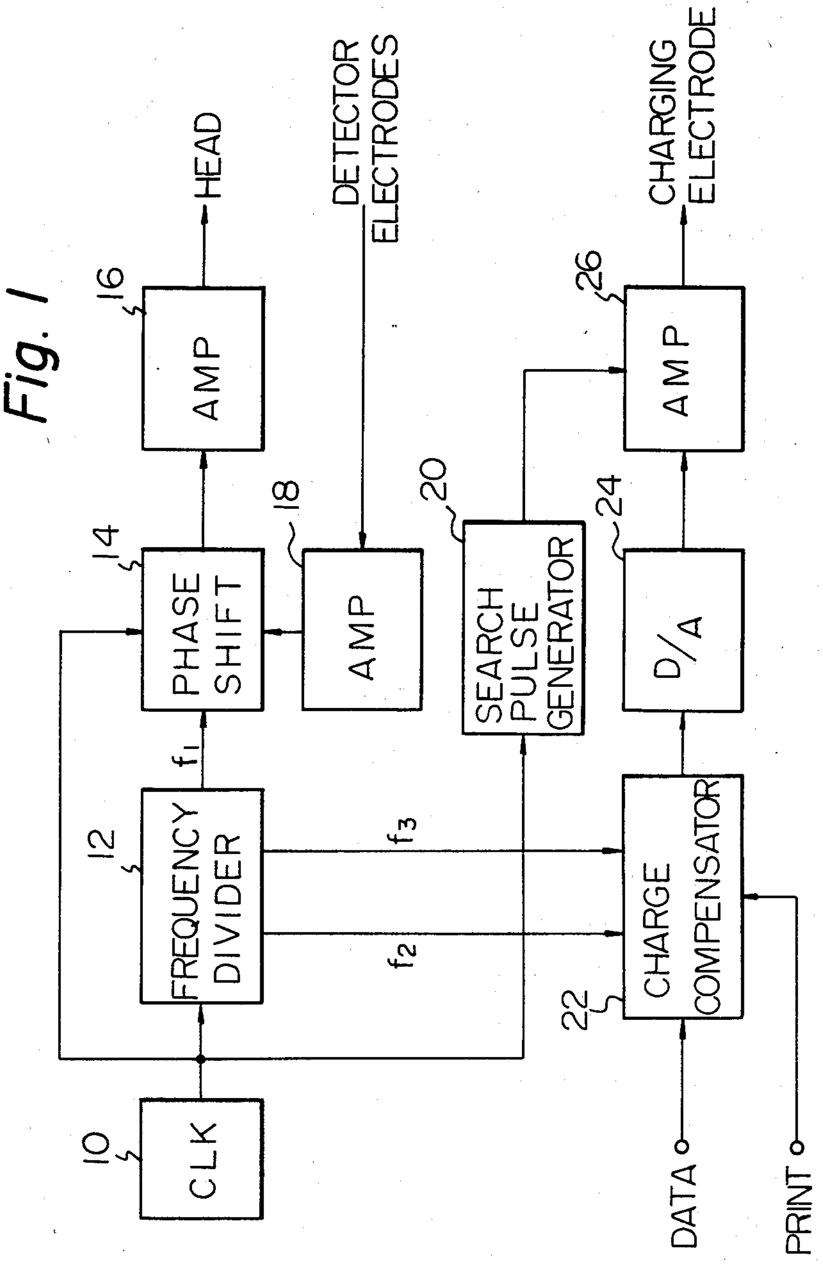
FIG. 1 is a block diagram of a prior art ink jet recording apparatus.
Figure 3:
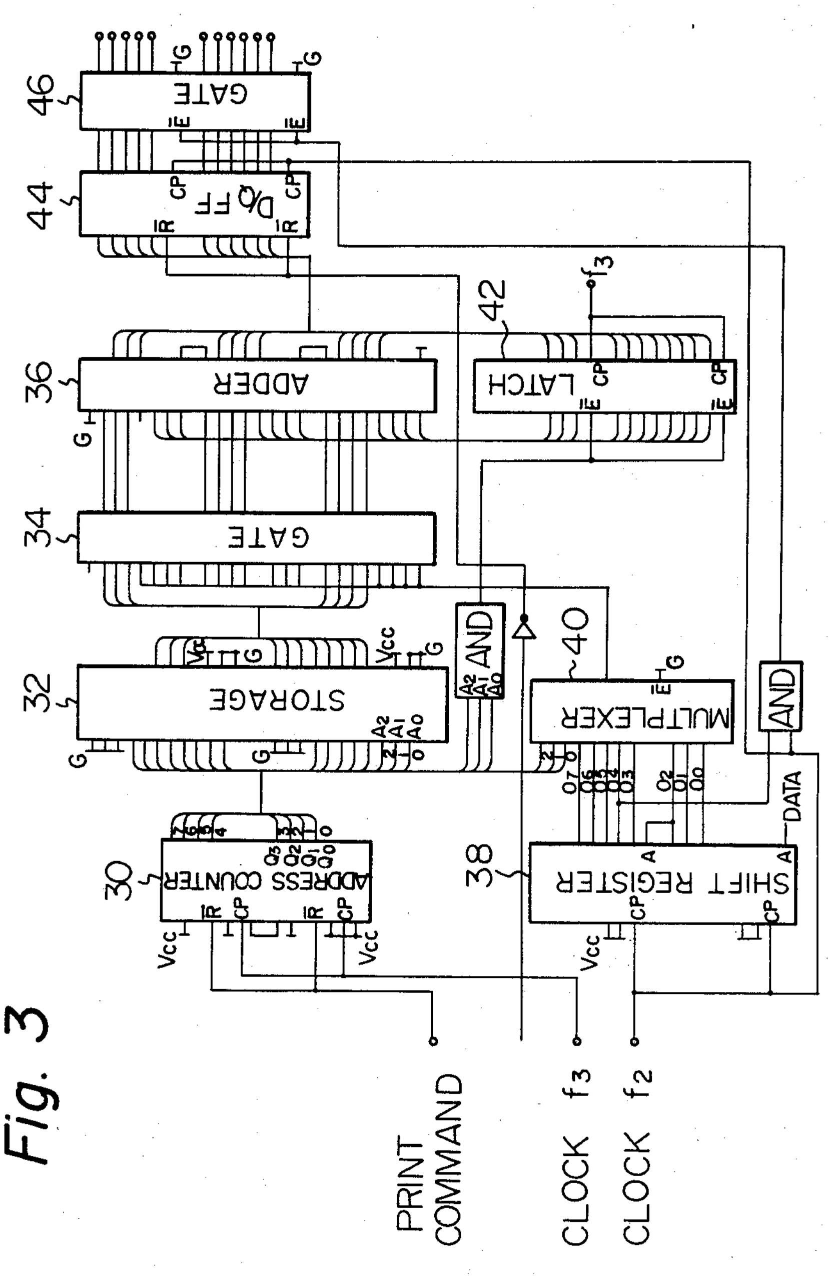
FIG. 3 is a block diagram showing details of a charge compensation circuit included in the apparatus of FIG. 1.

Referring to FIGS. 1–3, a prior art ink jet printing apparatus includes a clock pulse generator 10, a frequency divider 12, a phase shift circuit 14, and amplifiers 16 and 18. Also included in the printer are a search pulse generator 20, a charge compensation circuit 22, a digital-to-analog or A/D converter 24 and an amplifier 26. The ink ejection head of the printer is driven at a frequency of 132 kHz while two uncharged guard ink droplets are employed per charged ink droplet to reduce distortion, though the guard droplets are not essential. Droplets of ink are charged at a frequency of 44 kHz. The charging voltage is variable within the range of 50–240 V depending upon the input signal. The clock pulse generator 10 oscillates clock pulses at a frequency of 1056 kHz which is divided by the frequency divider 12 to $\frac{1}{8}$, $\frac{1}{3}$ and 1/24. The $\frac{1}{8}$ output of the frequency divider, signal $f_1$, is fed to the phase shift circuit 14 as a train of drive pulses whose frequency coincides with the breaking-into-droplets frequency, 132 kHz. The 1/24 output, signal $f_2$, is fed to the charge compensator 22 as a train of 44 kHz charge pulses. Further, the $\frac{1}{3}$ output, signal $f_3$, is coupled to the charge compensator 22 as a train of 352 kHz compensation pulses. The charge compensator 22 stores various amounts of compensation which will be sequentially read out. Depending on the presence/absence of the compensating data, the charge compensator 22 determines whether or not to add a compensating amount to a basic charging code. The sum is processed by the D/A converter 24 into an analog signal which is then passed through the amplifier 26 to a charging electrode. A storage included in the charge compensator 22 such as a ROM or a RAM stores the compensating amounts in the form of binary values. The storage also stores therein basic charging codes which allow each ink droplet to reach a predetermined position when deflected free from the influence of preceding or following droplets.

As shown in FIG. 2, a basic charging code has eleven bits which are divided into a string of three bits, a string of four bits and a string of four bits which are displayed in octal, hexadecimal and another hexadecimal form, respectively. Hence, the storage has an 11-bit parallel arrangement and should only be provided with at least a number of bits [11 bits×8 dots×32 steps]. Of the codes shown in FIG. 2, the code "7FF" at the 31st step of $F_2$ is the code with a complement added to the basic charging code to subtract "1" from the basic charging code. The basic charging code is non-linear because the aerodynamic resistance depends on the amount of deflection; the compensating amount is determined on the basis of the individual ink droplet. The basic charging codes and compensating amounts can be obtained by computer simulation and then corrected by experiments.

Referring to FIG. 3, the charge compensator 22 comprises an address counter 30, a storage (ROM) 32, a gate 34, an adder 36, a shift register 38, a multiplexer 40, a latch circuit 42, a D/Q flip-flop 44 and a gate 46. The charge compensator 22 operates as follows.

When the print command becomes high level, the address counter 30 is enabled and incremented by clock pulses $f_3$ from the frequency divider 12. Because the frequency of the clock pulses $f_3$ is eight times the frequency of the clock pulses $f_2$, which are also delivered from the frequency divider 12, it will be seen that eight data in each row in FIG. 2 are read out during one cycle of the clock pulses $f_2$.

The shift register 38 delays print data and its output $O_3$ indicates the data to be charged. In detail, $O_0$, $O_1$ and $O_2$ indicate the following droplets and correspond to $F_3$, $F_2$ and $F_1$ of FIG. 2, respectively. $O_4$–$O_7$ indicate the preceding droplets which correspond to $P_1$–$P_4$ of FIG. 2, respectively.

The lower-column three bits in the address counter 30 are coupled to the multiplexer 40 which is controlled to supply the gate 34 with the content of $O_0$ if the content of the input three bits is "0" and the content of $O_1$ if the latter is "1". In this manner, seven data before and after the print data, that is, eight data in total are selected in accordance with the content of the lower-column three bits in the address counter 30.

The gate 34 controls the output of the storage 32 in response to the output of the multiplexer 40. If the output of the multiplexer 16 indicates "compensation", as distinguished from "non-compensation", the gate 34 feeds an output of the storage 32 to the adder 36 therethrough as a value of compensation. The output of the adder 36 is delayed by the latch 42 to be added with the next value of compensation. The input to the latch 42 is inhibited, however, when the content of the lower-column three bits in the address counter 30 becomes "7", the latch then being loaded with "0".

The output of the adder 36 is also coupled to the D/Q flip-flop 18 and is sampled at the leading edge of a charge pulse $f_2$. The resulting compensated value is stored in the flip-flop 18. Printing is controlled depending on the presence/absence of print data such that, when data is present, the compensated value is fed from the flip-flop 44 to the D/A converter 24 as a charging code which enables printing to be compensated.

It will be seen from the above that the prior art printer promotes adequate compensation in accordance with the presence/absence of print data and a specific number of deflection steps.

Figure 4:
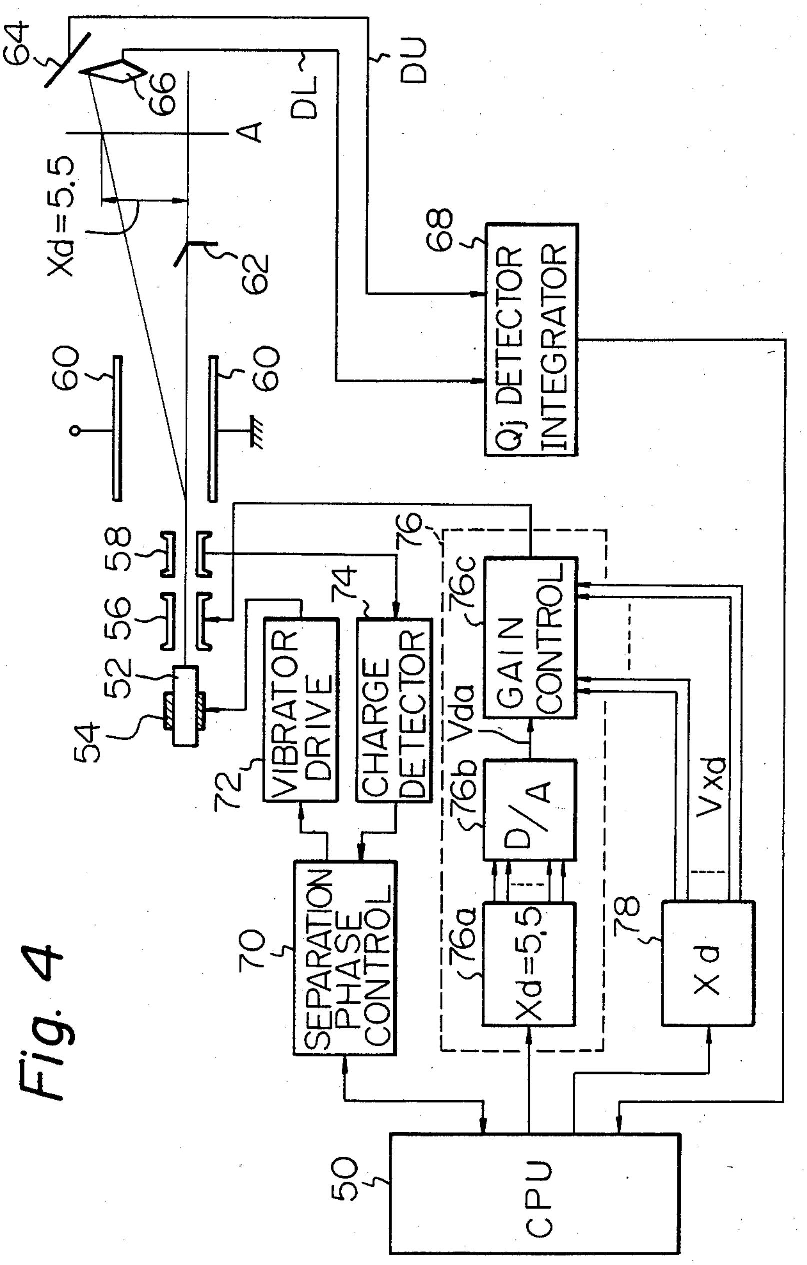
FIG. 4 is a diagram showing a part of an example of a deflection amount control ink jet recording apparatus.

FIG. 4 schematically illustrates an example of ink jet printers of the deflection control type. As shown, the ink jet printer includes a microcomputer 50, an ink ejection head 52, a piezoelectric vibrator 54, a charging electrode 56, a charge detection electrode 58 and a pair of deflection electrodes 60. The printer also includes a gutter 62, an upper electrode 64 for the detection of a deflection, a lower electrode 66 coacting with the upper electrode 64, and a Qj (charging amount) detection and integration circuit 68. Further included in the printer are an ink separation phase control circuit 70, a piezoelectric vibrator drive circuit 72, a charge detection circuit 74, a charging signal generation circuit 76 and a charge ($V_{xd}$) compensating code generation circuit 78. The charging signal generation circuit 76 comprises a basic charging code generator 76*a*, a digital-to-analog or D/A converter 76*b* and an amplification gain control 76*c*. The input of the D/A converter 76*b* is designated with the 32nd step basic code H'618' and controlled such that the gain code becomes higher if the output of the lower detector electrode 66 is present but lower if the output of the upper detector electrode 64 is present. Consequently, the output $V_{da}$ of the D/A converter 76b undergoes compensation by an amount $\alpha_{xd}$. That is, supposing that the basic gain code is $\alpha_O$, then $$V_n = V_{dan} \cdot \alpha_0 \left( 1 + \frac{\alpha_{xd} - \alpha_0}{\alpha_0} \right)$$

Figure 5:
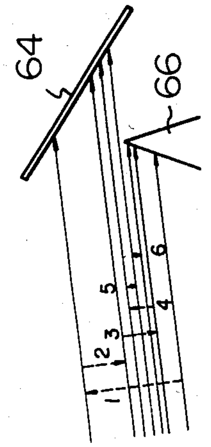
FIG. 5 is a diagram showing details of a part of the apparatus of FIG. 4 which includes deflection detector electrodes.

Referring to FIG. 5, the detector electrodes 64 and 66 are shown in detail which are adapted to compensate for any fluctuation in deflection. In a detection and compensation mode of the printer, a carriage is kept stationary in alignment with the electrodes 64 and 66. The basic charging code generator 76a of the charge signal generator 76 supplies the D/A converter 76b with a basic charging code, which may define a distance Xd of, for example, 5.5 mm at a sheet position A shown in FIG. 4 under basic conditions. "n" ink droplets are successively charged at a predetermined cycle of uncharged guard ink droplets (e.g. 63). The charged ink droplets are deflected and received by the electrodes 64 and 66. The amplifier gain is maintained constant until the output level of the Qj detector and integrator 68 reaches a threshold level. When the deflection is smaller than 5.5 mm so that the integrator 68 is supplied with the output DL of the lower detector electrode 66, the Xd compensation code generator 78 is controlled to compensate the amplifier gain control 76c in a direction to increase the amplifier gain. When the deflection is larger than 5.5 mm with the integrator 68 receiving the output DU of the upper detector electrode 64, the Xd compensation code generator 78 operates the amplifier gain control 76c in the opposite direction to reduce the amplifier gain. Such a procedure is repeated thereafter by reducing the amount of compensation by ½ the initial amount 1 each time (the initial amount being a designed value designated by a code) and reducing the amount of increase or decrease of the gain by ½ each time. The detection and compensation mode is terminated when the output has switched over between the lower and upper detector electrodes at the minimum amount of variation 6 (designed value). The gain is kept at the one which then existed and the printer enters a printing operation.

Figure 6:
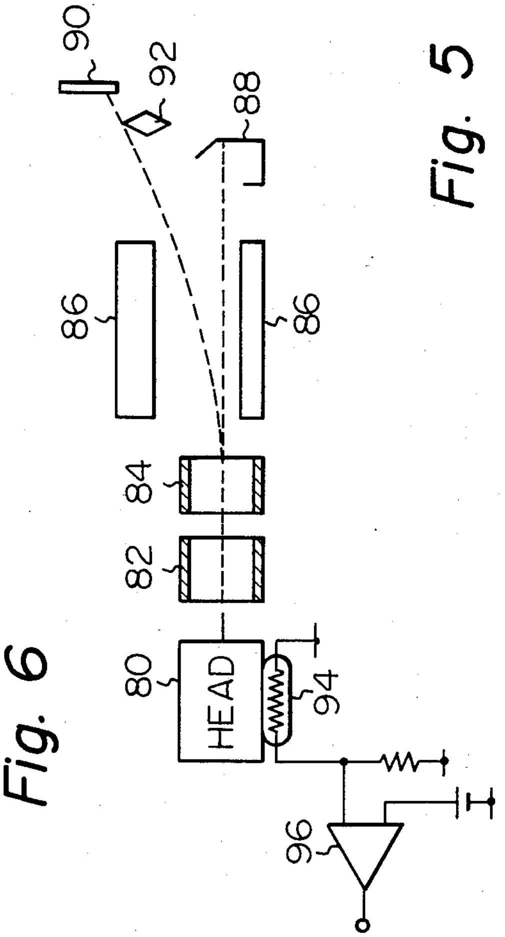
FIG. 6 is a schematic fragmentary view of an ink jet printing apparatus embodying the present invention.

Referring to FIG. 6, there is shown one embodiment of the ink jet printing apparatus of the present invention. The ink jet printer includes an ink ejection head 80, a charging electrode 82, a charging phase search electrode 84, a pair of deflection electrodes 86, a gutter 88, an upper deflection detector electrode 90 and a lower deflection detector electrode 92. The printer additionally includes a temperature sensor 94 and a temperature discrimination circuit 96. In response to a print command, a deflection amount control is carried out. Then, a temperature discrimination is performed in which the output signal of the temperature sensor 94 is coupled to the temperature discriminator 96. The sensor output is compared with a reference voltage at the temperature discriminator 96. The output of the temperature discriminator 96 becomes logical "1" when the sensor output is larger than the reference value at normal operating temperatures of the ink (e.g. reference voltage corresponding to 10°C.) or logical "0" when otherwise, occuring during an initial operating period after startup of the apparatus.

Figure 7:
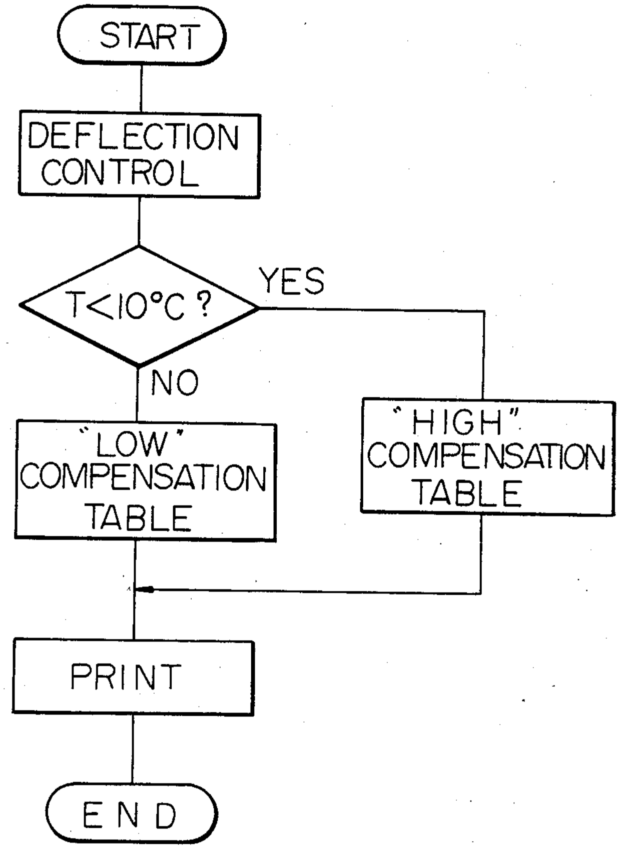
FIG. 7 is a flowchart demonstrating the operation of the apparatus shown in FIG. 6.

FIG. 7 is a flowchart demonstrating the operation of the printer shown in FIG. 6. FIGS. 8a and 8b indicate different tables which will be selectively used by the printer for compensation. It should be remembered here that each of the compensation tables is prepared to free an ink droplet from the influence of the preceding five droplets ($S_1$–$S_5$) and that of the following two droplets ($K_1$ and $K_2$). When the temperature of the head 80 sensed by the sensor 94 is higher than 10° C., for example, the output of the discriminator 96 becomes logical "1" level so that the "LOW" compensation table shown in FIG. 8a is selected. When the temperature of the head 80 is lower than 10° C., the output of the discriminator 96 becomes logical "0" level selecting the "HIGH" compensation table shown in FIG. 8b. This is followed by a printing operation in which data will be printed out after a compensation based on the selected compensation table.

Thus, where the temperature of ink inside the head 80 remains lower than 10° C. to reduce the kinetic energy of flying ink droplets and, thereby, increase the distortion of data printed out, the compensation table corresponding to such a condition is selected to compensate for the distortion. It will therefore be seen that the printer shown in FIG. 6 can print out data always with excellent quality without the need for a temperature control on the ink ejection head or waiting for the printer to build up to its operable temperature.

Figure 9:
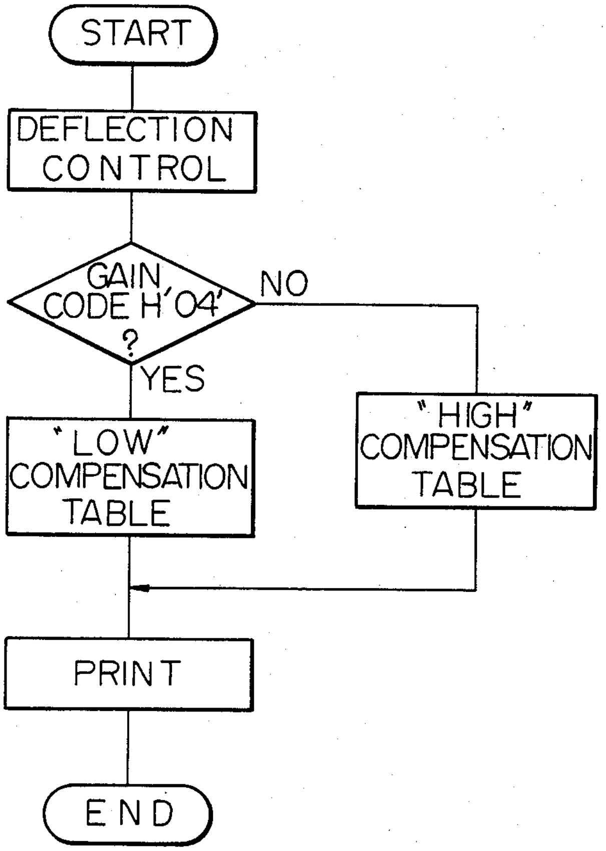
FIG. 9 is a flowchart indicating the operation of another embodiment of the present invention.

Referring to FIGS. 9, 10a and 10b, another embodiment of the present invention is shown which is particularly designed to vary an amount of compensation for distortion in accordance with an amount of control (amount of compensation), thereby enhancing the quality of data reproduction. In response to a print command, a deflection control is carried out to determine a gain code. Then, the gain code is compared with a code indicating a predetermined deflection, e.g. H'40'. When the gain code is larger than the code H'40' indicating that the kinetic energy of ink droplets is relatively large, the "LOW" compensation table shown in FIG. 10a is selected. When otherwise, the "HIGH" compensation table shown in FIG. 10b is selected. Thereafter, the printer starts a printing operation in which data are printed out with the distortion compensated on the basis of the selected compensation table. Again, each table shown in FIG. 10a or 10b is prepared to compensate for the influence of the preceding five droplets ($S_1$–$S_5$) and that of the following two droplets ($K_1$ and $K_2$).

From the operation demonstrated in FIG. 9, it will be understood that a specific compensation table is selected for adequate compensation in conformity with kinetic energy of flying ink droplets, thereby improving the printing quality.

Figure 11:
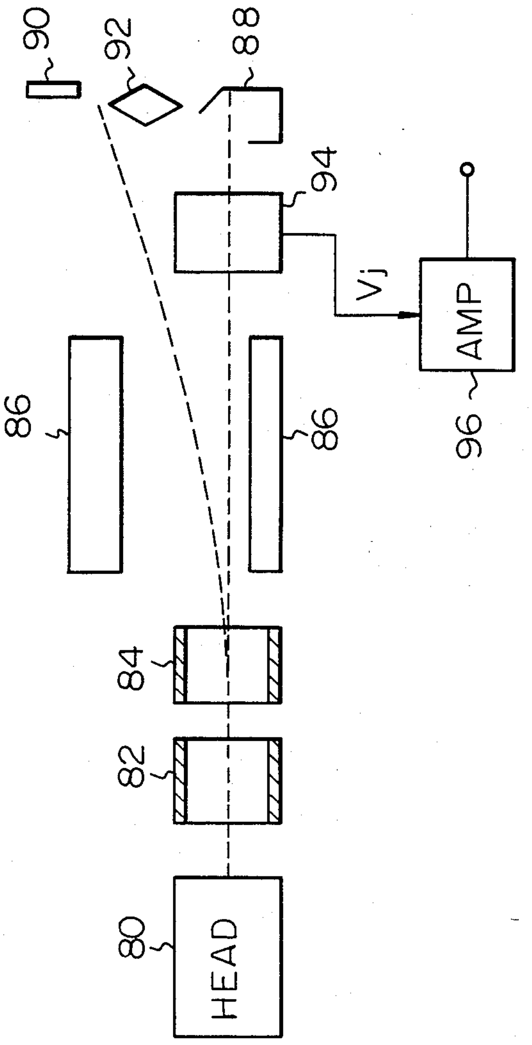
FIG. 11 is a fragmentary view of still another embodiment of the present invention.

Referring to FIG. 11, still another embodiment of the present invention is shown which comprises a detector electrode 194 responsive to the flying velocity of a flying ink droplet and an amplifier 196 connected with the detector electrode 194, in addition to the structural elements 80–92 shown in FIG. 6. When a print command is produced, a deflection control occurs to determine a maximum deflection of, for example, 5.5 mm. The deflection control is followed by a test charging which applies to one ink droplet an about 100 V charging signal whose polarity is opposite to the ordinary printing charges. When an ink droplet undergone the test charging has been detected by the phase search electrode 84, a counter (not shown) starts to be incremented at every 0.5 msec until an output signal appears from the velocity detector electrode 40. Then, the counter is stopped and the count existing that time is compared with a reference value by a comparator (not shown).

Figure 12:
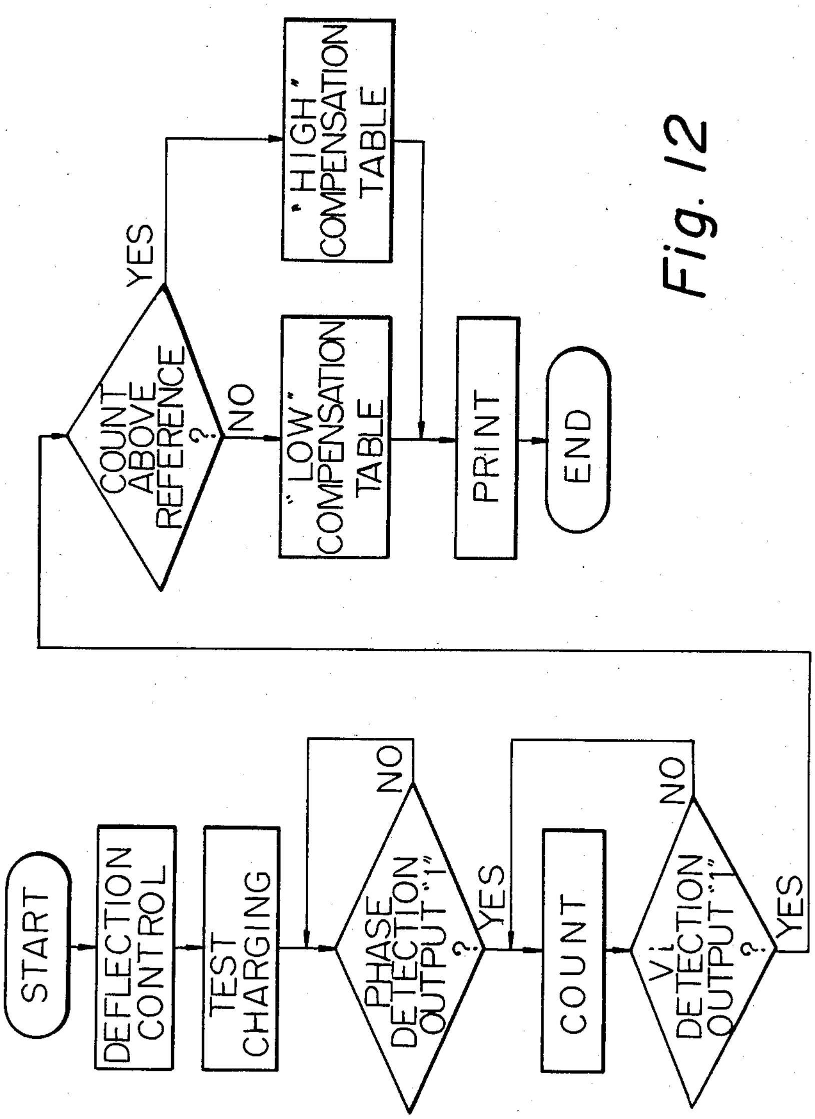
FIG. 12 is a flowchart demonstrating the operation of the apparatus indicated in FIG. 11.

FIG. 12 is a flowchart showing the operation of the printer illustrated in FIG. 11, while FIGS. 13*a* and 13*b* indicate compensation tables which are used for the operation. Again, the table shown in FIG. 13*a* or 13*b* is designed to compensate for the influence of the preceding five droplets ($S_1$–$S_5$) and that of the following two droplets ($K_1$ and $K_2$). When the flight velocity of ink droplets is low as represented by a count of the counter larger than the reference value, the "HIGH" compensation table shown in FIG. 13*a* is selected for the compensation. When the flight velocity of ink droplets is low as represented by a count of the counter smaller than the reference value, the "LOW" compensation table shown in FIG. 13*b* is selected. Thereafter, the printer starts a printing operation for printing out data after compensating for the distortion based on the selected table.

Thus, in the construction shown in FIG. 11, a specific compensation table is selected in accordance with a flying velocity of ink droplets and, therefore, kinetic energy thereof, to match the compensation with the kinetic energy of flying droplets. This realizes high quality image reproduction regardless of the time period which the printer would consume to reach its desired temperature.

Figure 14:
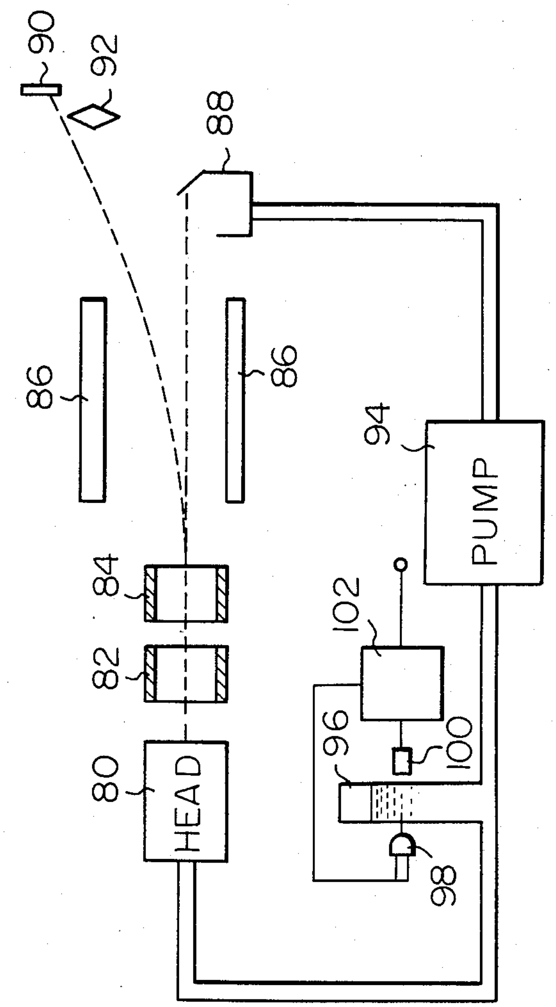
FIG. 14 is a fragmentary view of a further embodiment of the present invention.

Referring to FIG. 14, a further embodiment of the present invention is shown in which the same structural elements as those of any one of the foregoing embodiments are denoted by the same reference numerals. As shown, the gutter 88 communicates to a pump 294 which in turn communicates to the ink ejection head 80 through an accumulator 296 which may be air operated, for instance. A light emitting element 98 and a light receiving element 100 constitute a photoelectric sensor and are located in coactive positions at both sides of the accumulator 296. The photoelectric sensor is electrically connected with a pressure (ink level) detector 102. A deflection control is performed in response to a print command, whereafter whether or not the output of the pressure detector 102 is logical "1" is checked. The pressure detector 102 is constructed to produce an output which becomes logical "1" level if the output of the pressure detector 102 is higher than a predetermined level but logical "0" level if otherwise.

Figure 15:
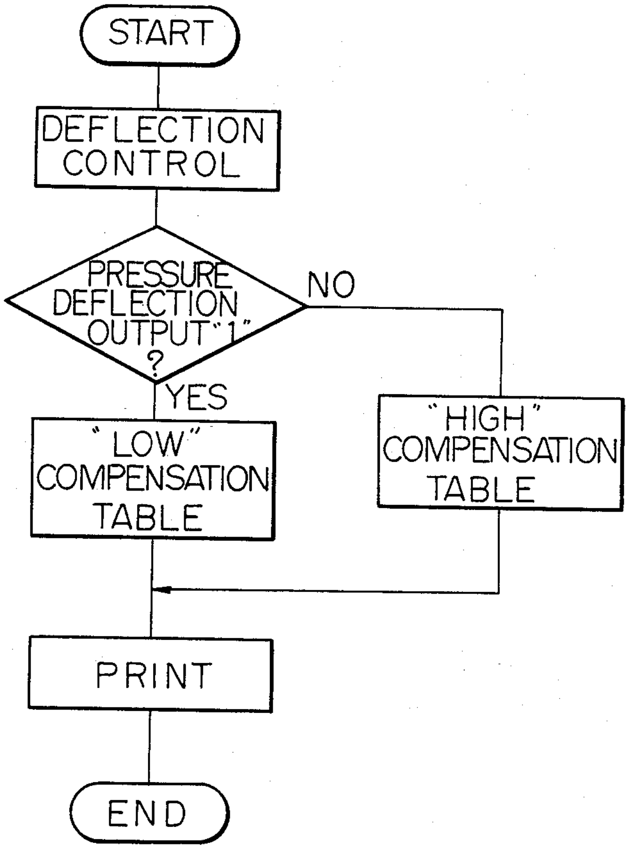
FIG. 15 is a flowchart demonstrating the operation of the apparatus indicated in FIG. 14.

FIG. 15 is a flowchart explanatory of the operation of the printer shown in FIG. 14. FIGS. 16*a* and 16*b* show compensation tables used for the operation. As in the foregoing embodiments, the tables are individually prepared to free an ink droplet from the influence of the preceding five droplets ($S_1$–$S_5$) and that of the following two droplets ($K_1$ and $K_2$). When the output of the detector 102 is "1" level indicating a pressure (ink level) above the reference pressure in the accumulator 41, the "LOW" compensation table shown in FIG. 16*a* is designated. The "HIGH" compensation table shown in FIG. 16*b* will be designated if the detector output is "0" level. The subsequent procedure is common to that described in the various embodiments already described.

It will be seen that the construction shown in FIG. 14 permits data to be printed out with excellent quality by selecting an adequate compensation table which matches the specific kinetic energy of ink droplets, which follows any change of ink pressure.

Various modifications will become possible for those skilled in the art after receiving the teachings of the present disclosure without departing from the scope thereof.

What is claimed is:

1. An ink jet printing apparatus comprising: an ink ejection head for ejecting a jet of ink;

charging means for electrostatically and selectively charging ink droplets separated from the ink jet;

deflection means for electrostatically deflecting the charged ink droplets;

deflection detecting means for detecting an amount of deflection of the ink droplets;

ink conditioning detecting means for detecting a condition of the ink; and control means for controlling at least one of the charging means and the deflection means to compensate for a distortion in print position in accordance with a condition of the ink detected by said ink condition detecting means;

the ink condition detecting means comprising a temperature sensor for sensing a temperature of the ink adjacent to the ink ejection head;

the control means comprising a storage for storing at least two ink temperature compensation tables, one being read out for compensating for a distortion in print position caused by the deflected ink droplets at normal operating temperatures above a predetermined reference temperature, and the other being read out for compensating for a distortion in print position caused by the deflected ink droplets at temperatures below the reference temperature occurring during an initial operating period after startup of the apparatus.

2. An ink jet printing apparatus as claimed in claim 1, in which the reference temperature is 10° C.

3. An ink jet printing apparatus comprising:

an ink ejection head for ejecting a jet of ink;

charging means for electrostatically and selectively charging ink droplets separated from the ink jet;

deflection means for electrostatically deflecting the charged ink droplets;

deflection detecting means for detecting an amount of deflection of the ink droplets;

ink condition detecting means for detecting a condition of the ink; and control means for controlling at least one of the charging means and the deflection means to compensate for a distortion in print position in accordance with a condition of the ink detected by said ink condition detecting means;

the ink condition detecting means comprising an ink pressure detector for detecting a pressure of the ink to be ejected from the ink ejection head;

the control means comprising a storage for storing at least two ink pressure compensation tables, one being read out for compensating for a distortion in print position caused by the deflected ink droplets under normal operating pressures of the ink higher than a predetermined reference pressure, and the other being read out for compensating for a distortion in print position caused by the deflected ink droplets under pressures of the ink lower than the refererence pressure occuring during an initial operating period after startup of the apparatus.

4. An ink jet printing apparatus comprising:

an ink ejection head for ejecting a jet of ink;

charging means for electrostatically and selectively charging ink droplets separated from the ink jet;

deflection means for electrostatically deflecting the charged ink droplets;

deflection detecting means for detecting an amount of deflection of the ink droplets;

ink condition detecting means for detecting a condition of the ink; and control means for controlling at least one of the charging means and the deflection means to compensate for a distortion in print position in accordance with a condition of the ink detected by said ink condition detecting means;

the ink condition detecting means comprising an ink velocity detector for detecting a velocity of the ink droplets in flight;

the control means comprising a storage for storing at least two ink velocity compensation tables, one being read out for compensating for a distortion in print position caused by the deflected ink droplets at normal operating velocities higher than a predetermined reference velocity, and the other being read out for compensating for a distortion in print position caused by the deflected ink droplets at velocities lower than the reference velocity occuring during an initial operating period after startup of the apparatus.

5. An ink jet printing apparatus comprising:

an ink ejection head for ejecting a jet of ink;

charging means for electrostatically and selectively charging ink droplets separated from the ink jet;

deflection means for electrostatically deflecting the charged ink droplets;

deflection detecting means for detecting an amount of deflection of the ink droplets;

ink condition detecting means for detecting a condition of the ink; and control means for controlling at least one of the charging means and the deflection means to compensate for a distortion in print position in accordance with a condition of the ink detected by said ink condition detecting means;

the ink condition detecting means comprising an ink kinetic energy detector for detecting a kinetic energy of the ink droplets in flight;

the control means comprising a storage means for storing at least two kinetic energy compensation tables, one being read out for compensating for a distortion in print position caused by the deflected ink droplets at normal operating kinetic energies higher than a predetermined kinetic energy value, and the other being read out for compensating for a distortion in print position caused by the deflected ink droplets at kinetic energies lower than the predetermined kinetic energy value occurring during an initial operating period after startup of the apparatus.

* * * * *